United States Patent
Kim

(10) Patent No.: US 10,512,252 B2
(45) Date of Patent: Dec. 24, 2019

(54) CAGE FARMING APPARATUS

(71) Applicant: OTECH SYSTEM Co., Ltd., Gyeongsangnam-do (KR)

(72) Inventor: Jungjoo Kim, Gyeongsangnam-do (KR)

(73) Assignee: OTECH SYSTEM Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 16/343,073

(22) PCT Filed: Oct. 11, 2017

(86) PCT No.: PCT/KR2017/011191
§ 371 (c)(1),
(2) Date: Apr. 18, 2019

(87) PCT Pub. No.: WO2018/074771
PCT Pub. Date: Apr. 26, 2018

(65) Prior Publication Data
US 2019/0335720 A1    Nov. 7, 2019

(30) Foreign Application Priority Data
Oct. 19, 2016   (KR) .................. 10-2016-0135786

(51) Int. Cl.
*A01K 61/65*  (2017.01)
*B66D 3/04*  (2006.01)
*B63B 22/04*  (2006.01)

(52) U.S. Cl.
CPC .............. *A01K 61/65* (2017.01); *B63B 22/04* (2013.01); *B66D 3/04* (2013.01)

(58) Field of Classification Search
CPC ................................. A01K 61/65; A01K 61/60
See application file for complete search history.

(56) References Cited

U.S. PATENT DOCUMENTS

| | | | | |
|---|---|---|---|---|
| 2,989,945 A * | 6/1961 | Ford | ...................... | A01K 61/60 119/240 |
| 5,412,903 A * | 5/1995 | Zemach | .................. | A01K 61/60 43/102 |
| 7,341,021 B2 * | 3/2008 | Cortinas | ................ | A01K 61/54 119/239 |

FOREIGN PATENT DOCUMENTS

FR    2665332 A1 *  2/1992   ............ A01K 61/60
KR    10-2011-0019185 A    2/2011
(Continued)

OTHER PUBLICATIONS

International Search Report dated Jan. 18, 2018 in corresponding International application No. PCT/KR2017/011191; 4 pages.

(Continued)

*Primary Examiner* — Kristen C Hayes
(74) *Attorney, Agent, or Firm* — Maier & Maier, PLLC

(57) ABSTRACT

The present invention provides a cage farming apparatus. The cage farming apparatus includes: a buoy configured to float on the surface of the sea; a central structure configured to be seated on the bottom surface of the sea and to be connected to the buoy by a lifting rope; a floating means fitted around the lifting rope, and configured to be lifted along the lifting rope due to buoyancy or to be lowered along the lifting rope due to a load; an auxiliary structure configured to be located on the bottom surface of the sea and to be spaced apart from the central structure; a cage net configured to be located above the auxiliary structure and to be connected to the floating means by a connecting rope; and pulleys formed on the central structure and the auxiliary structure, and configured to guide the connecting rope through its movement.

3 Claims, 8 Drawing Sheets

(56) References Cited

FOREIGN PATENT DOCUMENTS

| KR | 10-2012-0134671 A | 12/2012 |
|----|-------------------|---------|
| KR | 10-1341945 B | 12/2013 |
| KR | 10-1415103 B | 7/2014 |
| KR | 10-2016-0081481 A | 7/2016 |

OTHER PUBLICATIONS

Notification of Reason for Refusal dated May 17, 2017 in corresponding Korean application No. 10-2016-0135786; 10 pages.
Decision of Patent Allowance dated Aug. 11, 2017 in corresponding Korean application No. 10-2016-0135786; 4 pages.

\* cited by examiner

CAGE FARMING APPARATUS

FIELD

The present invention relates to a cage farming apparatus, and more specifically to a cage farming apparatus that is capable of considerably easily lifting a cage net under seawater to the surface of the sea without requiring a complicated device.

BACKGROUND

In general, farming using seawater can be basically divided into land water tank farming and marine cage farming. The land water tank farming is a method of farming target living things by transferring the living things to a land water tank and artificially regulating a living environment, and the marine cage farming is a method of confining and farming target living things in the wide space of the sea by using a net or the like.

Of these methods, the marine cage farming does not require the exchange of seawater and can farm fishes in large quantities unlike the land water tank farming, and is thus increasing gradually. The marine cage farming is performed by installing a net within a predetermined range in the sea or inland waters, such as waters surrounded by a dam, and farming specific fishes within the net. The marine cage farming is a method of constructing a net or special facility in a deep and wide water area, confining fishes in the net or facility, and farming the fishes therein. The marine cage farming is advantageous in that water can be easily exchanged because water can freely pass through the net inward and outward, oxygen can be smoothly supplied, metabolic wastes discharged during farming do not need to be removed or separated, and also it is considerably easy to farm fishes in large quantities because the quality of water within the cage is not deteriorated even when fishes are farmed in large quantities.

In the marine cage farming, feeding is generally performed in such a manner that a human directly scatters feed on the sea by means of a spraying or dumping method.

However, the marine cage farming is problematic in that a cage farming apparatus is located near the surface of the sea and is thus extremely vulnerable to waves and a typhoon.

Accordingly, the cage farming apparatus is located on the seabed in order to perform marine cage farming regardless of weather conditions. In this case, it is considerably difficult to feed fishes that are being farmed.

Furthermore, the conventional cage farming apparatus is disadvantageous in that it is impossible to freely adjust the depth of seawater at which a cage net is located according to the type of fishes. In particular, a disadvantage arises in that in order to lift a cage net to the surface of the sea when adult fishes are shipped, an operator needs to enter seawater and manually raise the cage net to the surface of the sea, or the cage net needs to be directly raised to the surface of the sea by binding the cage net with a rope and pulling the rope from the outside.

SUMMARY

A main object of the present invention is to provide a cage farming apparatus that enables a cage net under seawater to be simply lifted to the surface of the sea and towed via a floating means that is selectively lifted to the surface of the sea and lowered to the bottom surface of the sea, so that adult fishes within the cage net may be easily collected and the depth of seawater at which the cage net is submerged under seawater may be freely adjusted according to the type of fishes.

In order to overcome the above-described technical problem, the present invention provides a cage farming apparatus including:

a buoy configured to float on the surface of the sea;

a central structure configured to be seated on the bottom surface of the sea and to be connected to the buoy by a lifting rope;

a floating means fitted around the lifting rope, and configured such that a material having a specific gravity smaller than that of seawater is injected thereinto and thus it is lifted along the lifting rope due to buoyancy or such that seawater is injected thereinto and thus it is lowered along the lifting rope due to a load;

an auxiliary structure configured to be located on the bottom surface of the sea and to be spaced apart from the central structure by a predetermined distance;

a cage net configured to be located above the auxiliary structure and to be connected to the floating means by a connecting rope;

pulleys formed on the central structure and the auxiliary structure, and configured to guide the connecting rope through its movement so that the cage net is lifted to or lowered from the surface of the sea in response to lifting or lowering of the floating means; and a cage protecting net configured to be fastened to the auxiliary structure and to accommodate the cage net therein, and adapted such that the upper end thereof is closed and opened to allow the cage net to be removed to the outside and the lower end thereof is knotted by a knotting element through which the connecting rope passes.

According to the cage farming apparatus of the present invention, the cage net is connected to the floating means that is selectively lifted and lowered between the buoy on the surface of the sea and the bottom surface of the sea, so that the cage net under seawater may be easily lifted to the surface of the sea via the floating means, with the result that a considerable effect is achieved in that adult fishes within the cage net may be simply and easily collected and shipped.

Furthermore, according to the present invention, the height of the cage net under seawater may be adjusted via the floating means, so that the cage net may be located at an appropriate depth of seawater according to climate or the temperature of seawater, with the result that fishes may be effectively farmed in response to a change in climate or a change in the temperature of seawater.

DETAILED DESCRIPTION

Figure 1:
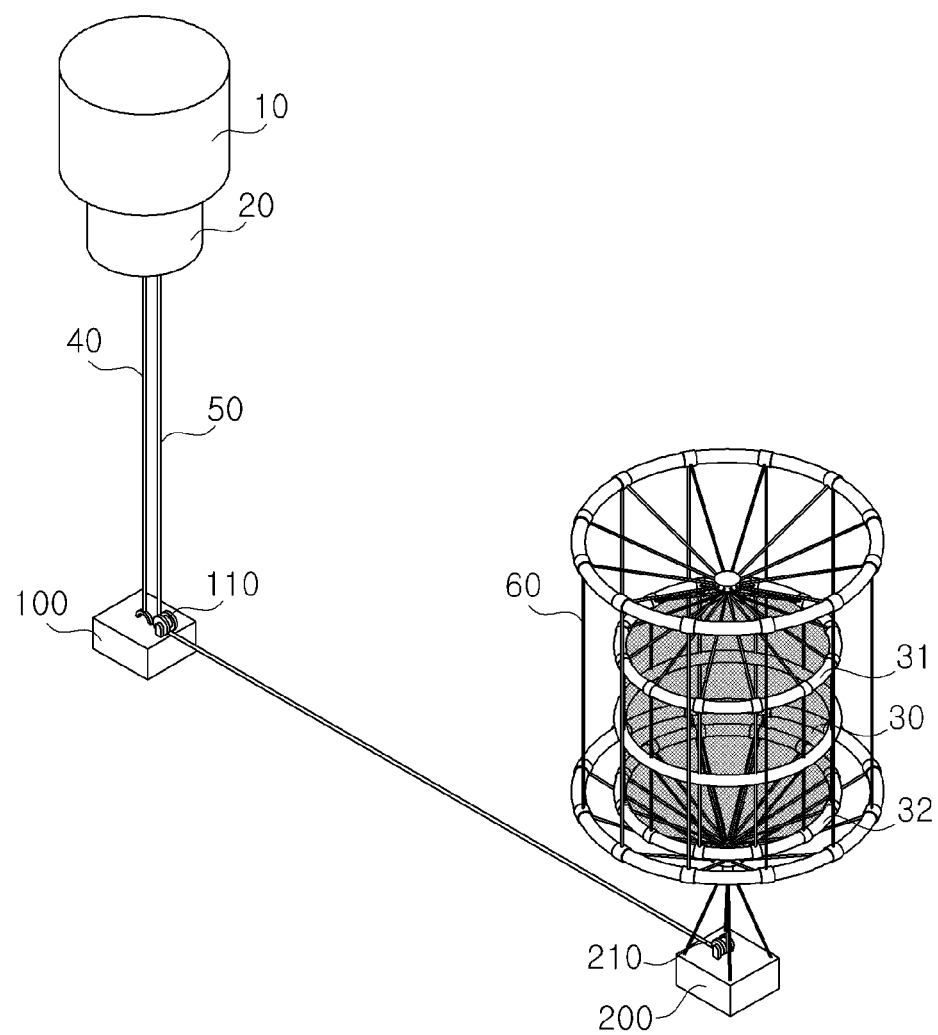
FIG. 1 are is a schematic diagram showing a state in which a cage farming apparatus according to the present invention is used.

A cage farming apparatus according to a preferred embodiment of the present invention includes: a buoy 10 configured to be located on the surface of the sea; a central structure 100 configured to be seated on the bottom surface of the sea and to be connected to the buoy 10 by a lifting rope 40; a floating means 20 fitted around the lifting rope 40 to be lifted or lowered, and configured such that a material having a specific gravity smaller than that of seawater is injected thereinto and thus it is lifted along the lifting rope 40 due to buoyancy or such that seawater is injected thereinto and thus it is lowered along the lifting rope 40 due to a load; an auxiliary structure 200 configured to be spaced apart from the central structure 100 by a predetermined distance and to be seated on the bottom surface of the sea; a cage net 30 configured to be located above the auxiliary structure 200, to be connected to the floating means 20 by a connecting rope 50, and to be lifted to the surface of the sea in response to the lowering of the floating means 20; pulleys 110 and 210 formed on the central structure 100 and the auxiliary structure 200, respectively, and configured to guide the connecting rope 50 through its movement; and a cage protecting net configured to be fastened to the auxiliary structure 200 and to accommodate the cage net 30 therein, and adapted such that the upper end thereof is closed and opened to allow the cage net 30 to be removed to the outside and the lower end thereof is knotted by a knotting element 61 through which the connecting rope 50 passes.

The preferred embodiment of the cage farming apparatus according to the present invention will be described in detail below with reference to the accompanying drawings.

Figure 2:
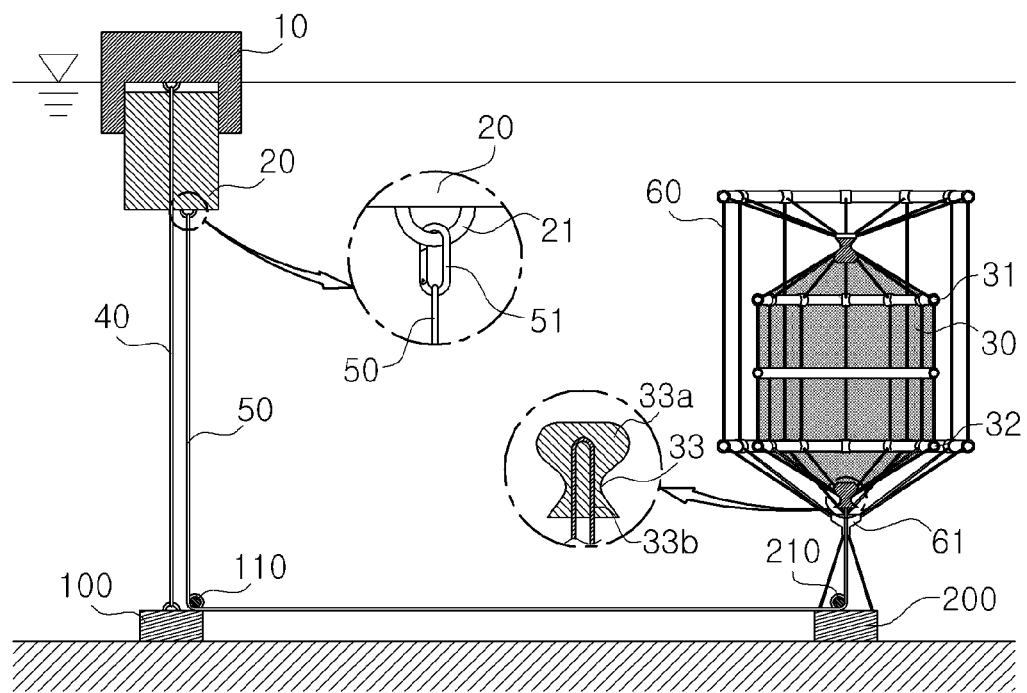
FIG. 2 is a section view showing a state in which a cage farming apparatus according to the present invention is used.
Figure 3:
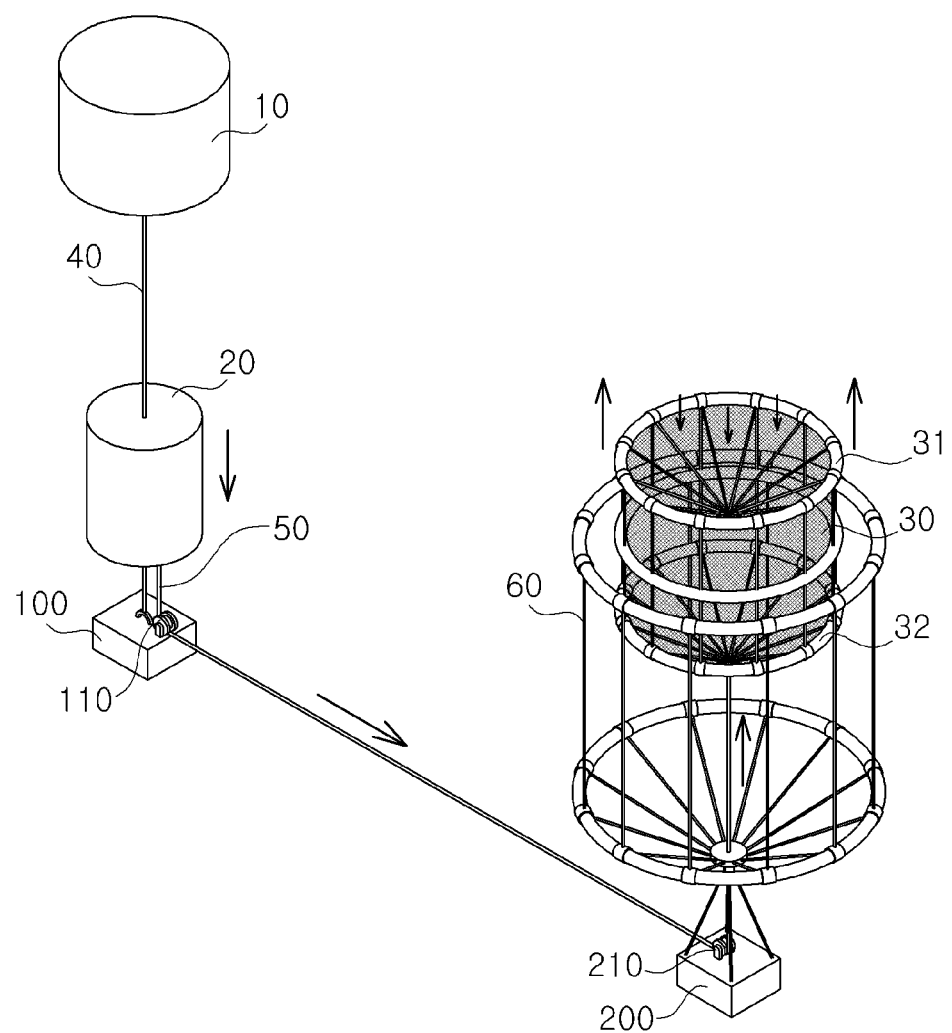
FIG. 3 is a schematic diagram showing a state in which a cage farming apparatus according to the present invention is used.
Figure 4:
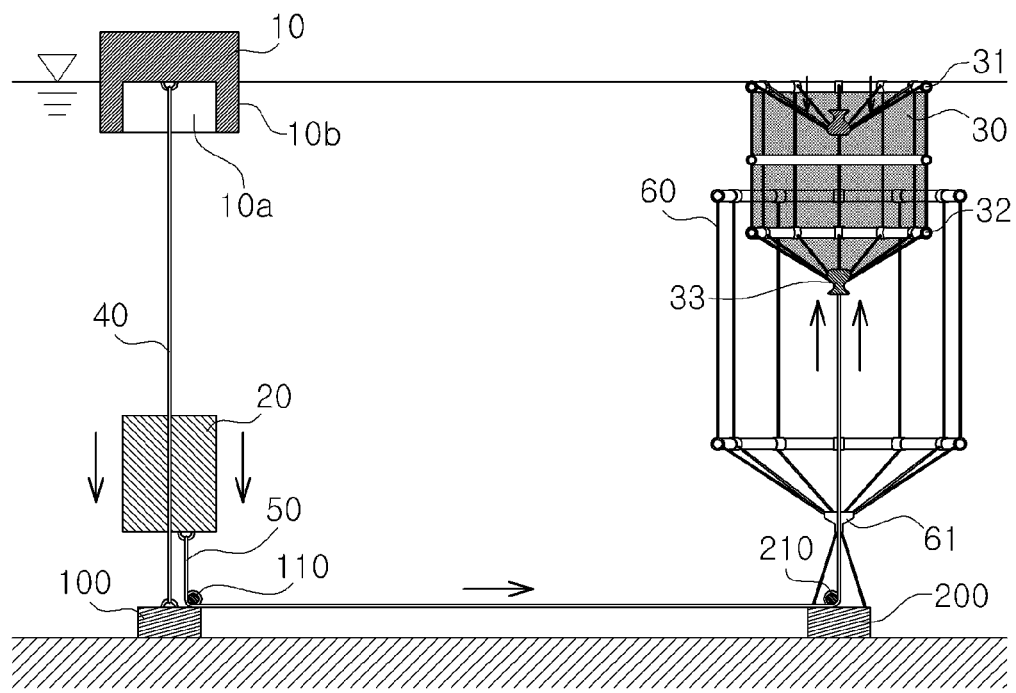
FIG. 4 is a sectional view showing a state in which a cage farming apparatus according to the present invention is used.

As shown in FIGS. 1 to 4, in the cage farming apparatus according to the present invention, the buoy 10 configured to indicate the location of the cage farming apparatus out of seawater floats on the surface of the sea and is fastened, and the central structure 100 configured to be seated on and fastened to the bottom surface of the sea by a load is provided on the bottom surface of the sea below the buoy 10.

The central structure 100 is submerged into seawater and seated on and fastened to the bottom surface of the sea due to its own weight like an anchor or concrete structure, and may be fastened to the bottom surface of the sea by a separate fastening means.

Furthermore, the buoy 10 and the central structure 100 are connected to each other by the lifting rope 40 or a cable having a predetermined length.

Furthermore, the floating means 20 configured such that a material having a specific gravity smaller than that of seawater, such as air, is injected thereinto and thus it is lifted along the lifting rope 40 due to buoyancy or such that seawater is injected thereinto and thus it is lowered along the lifting rope 40 due to a load is formed around the lifting rope 40.

In the buoy 10, a space portion (not shown) configured to be filled with a material having a specific gravity smaller than that of seawater, such as air, before the buoy 10 floats on the surface of the sea is formed, a blocking portion 10b configured to extend to a predetermined length downward is formed along the edge of the bottom surface of the buoy 10, and an accommodation cavity 10a having a predetermined space is formed inside the blocking portion 10b and the floating means 20 is inserted into the accommodation cavity 10a.

Accordingly, the floating means 20 is lifted along the lifting rope 40 and inserted into the accommodation cavity 10a, so that the floating means 20 is protected from an external shock by the blocking portion 10b and is blocked by the blocking portion 10b and prevented from being separated out of the buoy 10, with the result that an effect is achieved in that the lifting rope 40 is not shaken excessively.

Meanwhile, the auxiliary structure 200 corresponding to the central structure 100 is seated on and fastened to the bottom surface of the sea spaced apart from the central structure 100 by the predetermined distance, and the cage net 30 connected to the floating means 20 by the connecting rope 50 is located above the auxiliary structure 200. Furthermore, at least one pulley 110 or 210 or roller configured to guide the connecting rope 50 through its movement is provided on one surface of each of the central structure 100 and the auxiliary structure 200.

The cage net 30 is connected to the floating means 20 by the connecting rope 50, and is submerged under seawater. When the floating means 20 is lowered along the lifting rope 40 by the injection of seawater, the cage net 30 has buoyancy larger than that of the floating means 20 and is lifted to the surface of the sea. In contrast, when the floating means 20 has buoyancy larger than that of the cage net 30 and is lifted along the lifting rope 40 by the injection of air, the cage net 30 is lowered below the surface of the sea and submerged under seawater.

The pulleys 110 and 210 are installed on the top surfaces or side surfaces of the central structure 100 and the auxiliary structure 200. The pulleys 110 and 210 guide the connecting rope 50 through its movement and direction so that the floating means 20 and the cage net 30 are moved in opposite vertical directions, and allow the portions of the connecting rope 50, bent due to changes in direction, to be smoothly moved.

The connecting rope 50 connects the floating means 20 and the cage net 30 to each other. A hook-shaped fastening portion 21 is formed on one side of the floating means 20, and a fastening ring 51 configured to be fastened to the fastening portion 21 is formed at one end of the connecting rope 50 that is connected to the floating means 20.

The connection of the floating means 20 and the connecting rope 50 may be performed by various fastening means. It is preferred that the fastening ring 51 is freely fastened to and separated from the fastening portion 21 of the floating means 20.

Accordingly, in the cage farming apparatus of the present invention, when it is necessary to float the cage net 30, submerged under seawater, on the surface of the sea in order to ship adult fishes because fishes being farmed within the cage net 30 have become the adult fishes, the floating means 20 is lowered along the lifting rope 40 due to a load by injecting seawater into the floating means 20. Accordingly, the cage net 30 has buoyancy larger than that of the floating means 20 and is lifted to the surface of the sea, so that adult fishes within the cage net 30 may be easily collected and shipped.

The cage net 30 is supported by an upper frame 31 and a lower frame 32. A material having a specific gravity smaller than that of seawater is inserted into the upper frame 31, and thus the upper frame 31 attempts to be lifted to the surface of the sea due to its buoyancy. The lower frame 32 is caused to have smaller buoyancy than the upper frame 31, and thus the upper frame 31 and the lower frame 32 are separated from each other in vertical directions and a space capable of accommodating fishes is formed.

One or more buoyant spaces are formed inside the upper frame 31 and/or the lower frame 32, and at least two buoyant holes (not shown) each having a stopper may be formed in the upper frame 31 and/or the lower frame 32.

Furthermore, binding elements 33 configured to bind the upper and lower ends of the cage net 30 are fitted over the cage net 30. In each of the binding element 33, a binding portion is formed to bind the collected upper or lower end of the cage net 30 on the outer circumference thereof, a support portion 33a is formed to protrude to an outer circumference in a direction above the binding portion and to support the knot of the cage net 30, and an inverted "U"-shaped through hole 33b is formed to pass through the binding portion and the support portion 33a.

One end of the connecting rope 50 is connected to the binding element 33, and may be thus connected to the cage net 30. The connecting rope 50 may be connected to the cage net 30 by binding the connecting rope 50 around the outer circumferences of the upper and lower ends of the cage net 30 collected by the insertion of the binding elements 33.

The binding element 33 is preferably formed in a shape that collects an end of the cage net 30 and does not damage the cage net 30, such as a cylindrical shape. The shape of the binding element 33 may be modified into a prism having a polygonal section. In the case of a polyprism, it will be appropriate to prevent the cage net 30 from being damaged to make the corners of the binding element 33 round.

Meanwhile, according to the present invention, the cage protecting net 60 is formed outside the cage net 30 to have a volume larger than that of the cage net 30, accommodates the cage net 30 therein, is connected and fastened to the auxiliary structure 200 by a rope or metal wire, and is configured such that the upper end thereof is connected to the upper end binding element 33 of the cage net 30 and is opened to allow the cage net 30 to move to the outside when the cage net 30 is lifted and the lower end thereof is bound via the knotting element 61 through which the connecting rope 50 passes.

The cage protecting net 60 is supported by the upper frame and the lower frame that are vertically separated due to a difference in buoyancy, and the cage net 30 is accommodated in the space between the upper and lower frames of the cage protecting net 60.

The upper end of the cage protecting net 60 is fastened or separably connected to the upper end binding element 33 of the cage net 30. Before the cage net 30 is lifted to the surface of the sea, the upper end of the cage protecting net 60 is opened by separating the upper end of the cage protecting net 60 from the binding element 33.

In other words, the cage protecting net 60 protects the cage net 30 by surrounding the outside of the cage net 30. The cage protecting net 60 may block larger-sized fishes from approaching the cage net 30, and may protect the cage net 30 from other risk factors.

Figure 5:
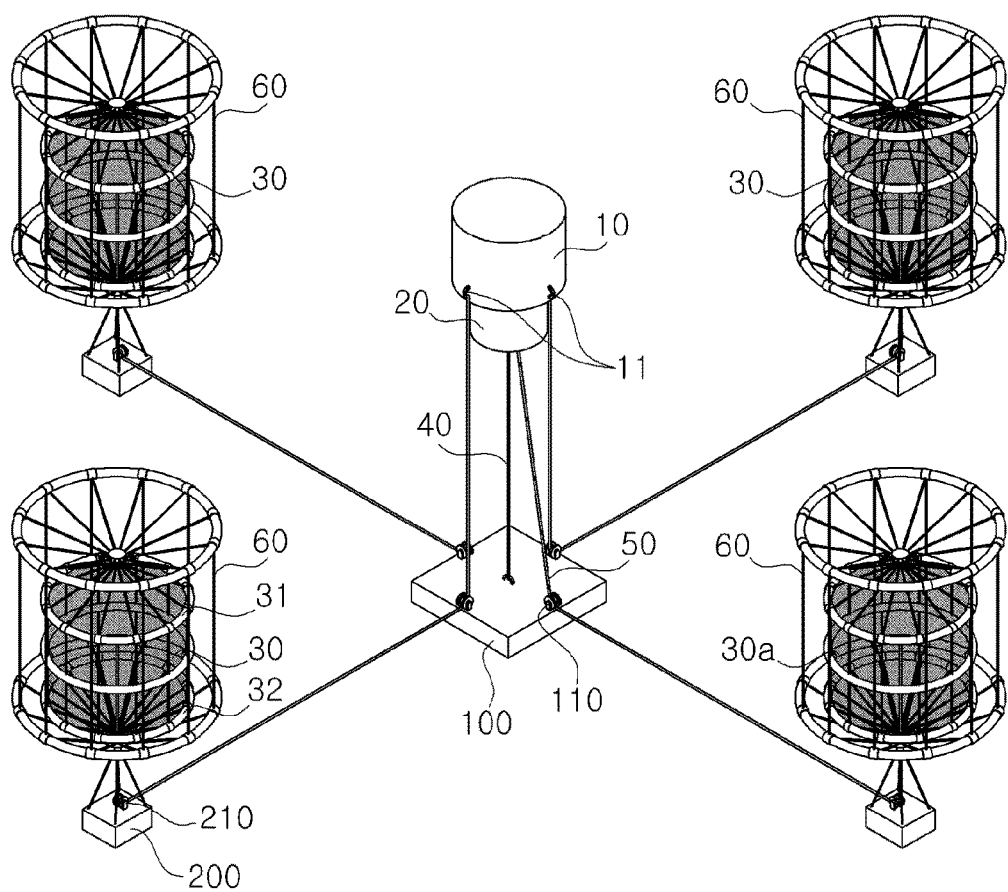
FIG. 5 is a schematic diagram showing another state in which a cage farming apparatus according to the present invention is used.
Figure 6:
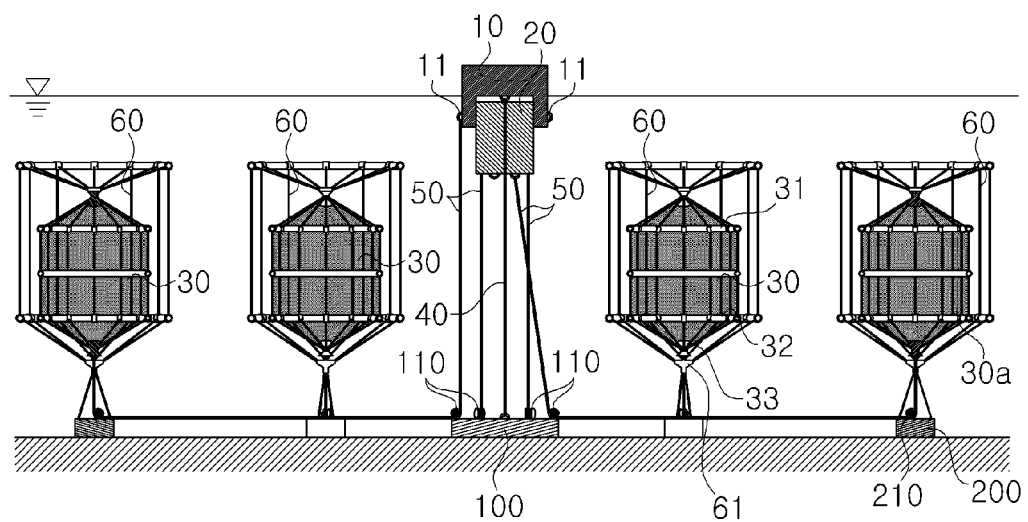
FIG. 6 is a sectional view showing another state in which a cage farming apparatus according to the present invention is used.
Figure 7:
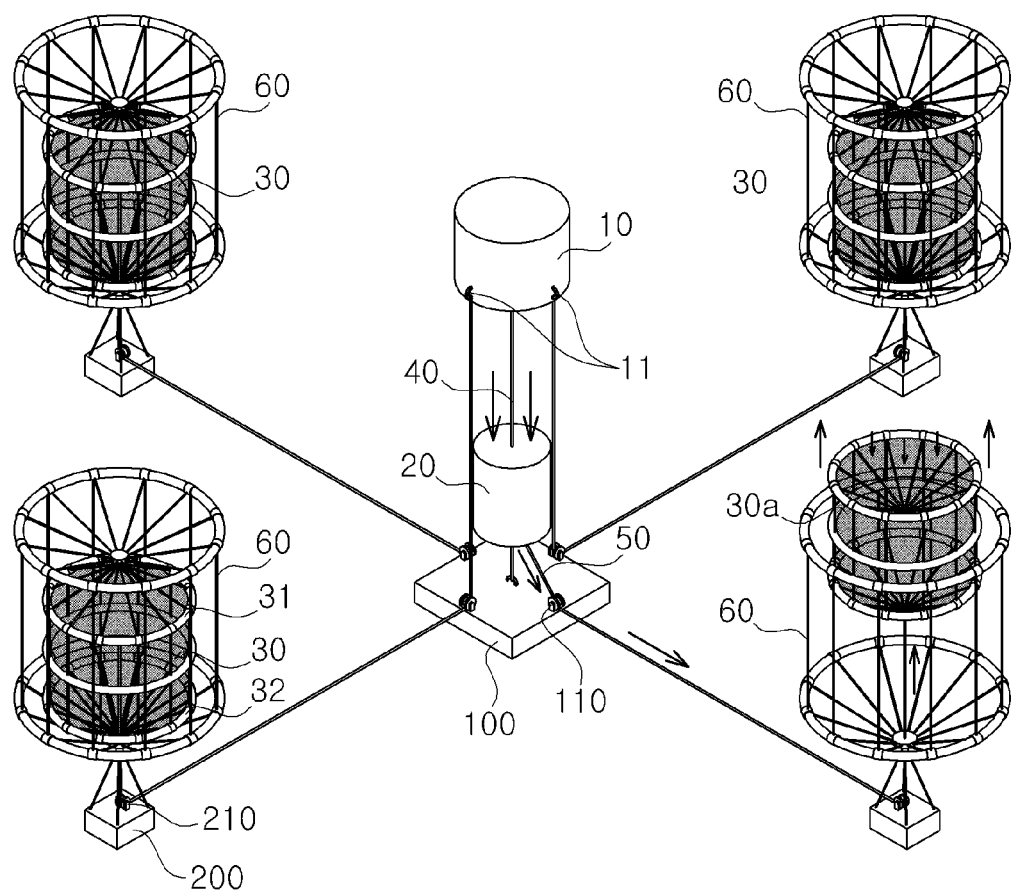
FIG. 7 is a schematic diagram showing another state in which a cage farming apparatus according to the present invention is used.
Figure 8:
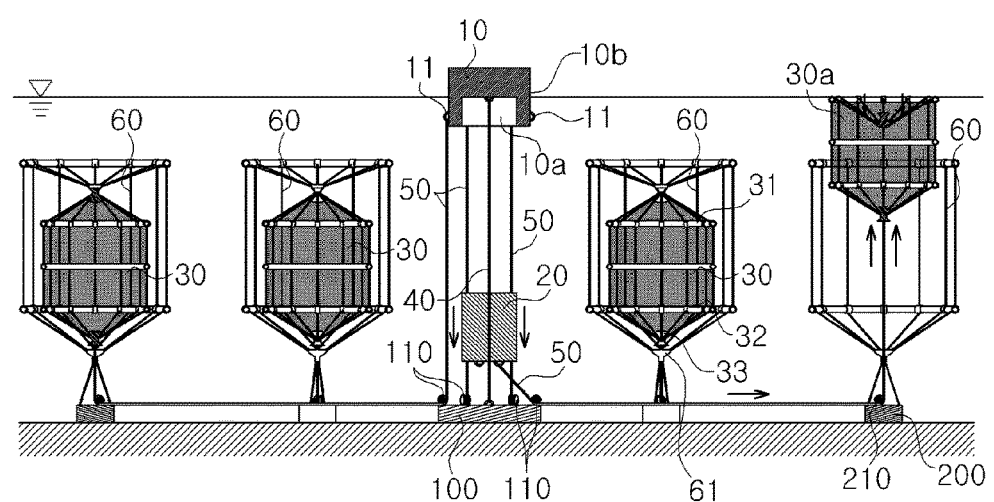
FIG. 8 is a sectional view showing another state in which a cage farming apparatus according to the present invention is used.

Next, FIGS. 5 to 8 show another preferred embodiment of a cage farming apparatus according to the present invention.

A plurality of auxiliary structures 200 is spaced apart from the outside of the central structure 100 by a predetermined distance, and is provided on the bottom surface of the sea. The cage net 30 is located above each of the auxiliary structures 200. In this case, the cage net 30 is connected to the buoy 10 by the connecting rope 50.

Furthermore, any one cage net 30a is selected from among the plurality of cage nets 30 connected to the buoy 10, and a connecting rope 50 connected to the selected corresponding cage net 30a is separated from the buoy 10 and connected to the floating means 20. Furthermore, the selected corresponding cage net 30a is lifted to the surface of the sea by injecting seawater into the floating means 20 and thus lowering the floating means 20 along the lifting rope 40.

A plurality of fastening portions 11 to which the fastening rings 51 of the connecting ropes 50 are fastened is formed on the buoy 10, and thus the connecting ropes 50 may be selectively fastened to and separated from the buoy 10 or floating means 20, so that the cage net 30 is connected to the buoy 10 or floating means 20.

In other words, the plurality of cage nets 30 is connected to the buoy 10 by the connecting ropes 50 connected thereto, the connecting rope 50 of the corresponding cage net 30a selected from among the plurality of the cage nets 30 connected to the buoy 10 is connected to the floating means 20 so that the selected single cage net 30a is connected to the floating means 20, and the corresponding cage net 30a connected to the floating means 20 is lifted to the surface of the sea in response to the lowering of the floating means 20.

Furthermore, one or more cage nets 30a may be selected from among the plurality of cage nets 30 connected to the buoy 10, and may be connected to the floating means 20. The one or more cage nets 30 may be lifted to the surface of the sea through the floating means 20 at one time.

Accordingly, according to the cage farming apparatus of the present invention, the cage nets 30 may be selectively or sequentially connected to the floating means 20, and may be simply lifted to the surface of the sea, with the result that a significant effect is achieved in that adult fishes within the cage nets 30 may be easily collected and shipped.

Although the preferred embodiments of the present invention have been disclosed for illustrative purposes, those skilled in the art will appreciate that the scope and spirit of the present invention are not limited to these embodiments, and various modifications, additions and substitutions are possible, without departing from the scope and spirit of the invention as disclosed in the accompanying claims.

The present invention enables the cage net under seawater to be simply lifted to the surface of the sea and towed via the floating means that is selectively lifted to the surface of the sea and lowered to the bottom surface of the sea, so that the cage net under seawater may be considerably easily lifted to the surface of the sea without requiring a complicated device, with the result that adult fishes within the cage net may be easily collected.

Furthermore, the height of the cage net submerged under seawater may be freely adjusted according to the type of fishes via the floating means of the present invention, and the cage net may be located at an appropriate depth of seawater according to climate or the temperature of seawater, with the result that the present invention may be effectively used in the fish farming industry that is sensitive to a change in climate or a change in the temperature of seawater.

The invention claimed is:

1. A cage farming apparatus comprising:
   a buoy configured to float on a surface of a sea;
   a central structure configured to be seated on a bottom surface of the sea and to be connected to the buoy by a lifting rope;
   a floating means formed around the lifting rope, and configured such that a material having a specific gravity smaller than that of seawater is injected thereinto and thus it is lifted along the lifting rope due to buoyancy or such that seawater is injected thereinto and thus it is lowered along the lifting rope due to a load;

an auxiliary structure configured to be located on the bottom surface of the sea and to be spaced apart from the central structure by a predetermined distance;

a cage net configured to be located above the auxiliary structure and to be connected to the floating means by a connecting rope;

pulleys formed on the central structure and the auxiliary structure, and configured to guide the connecting rope through its movement so that the cage net is lifted to or lowered from the surface of the sea in response to lifting or lowering of the floating means; and a cage protecting net configured to be fastened to the auxiliary structure and to accommodate the cage net therein, and adapted such that an upper end thereof is closed and opened to allow the cage net to be removed to an outside and a lower end thereof is knotted by a knotting element through which the connecting rope passes.

2. The cage farming apparatus of claim 1, wherein:

the auxiliary structure comprises a plurality of auxiliary structures formed to be spaced apart from the central structure by a predetermined distance, and a plurality of cage nets located above the auxiliary structures are connected to the buoy by connecting ropes; and a connecting rope of any one cage net selected from among the plurality of cage nets connected to the buoy is connected to the floating means;

so that the corresponding cage net connected to the floating means is lifted to the surface of the sea in response to lowering of the floating means.

3. The cage farming apparatus of claim 1, wherein an accommodation cavity into which the floating means is inserted is formed through a bottom surface of the buoy.

* * * * *